(12) United States Patent
Ko et al.

(10) Patent No.: US 9,237,438 B2
(45) Date of Patent: *Jan. 12, 2016

(54) CONTINUOUS CACHE SERVICE IN CELLULAR NETWORKS

(71) Applicant: International Business Machines Corporation, Armonk, NY (US)

(72) Inventors: Bongjun Ko, Harrington Park, NJ (US); Kang-won Lee, Nanuet, NY (US); Vasileios Pappas, Elmsford, NY (US); Dinesh Verma, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 157 days.

This patent is subject to a terminal disclaimer.

(21) Appl. No.: 13/972,163

(22) Filed: Aug. 21, 2013

(65) Prior Publication Data

US 2013/0337810 A1    Dec. 19, 2013

Related U.S. Application Data

(62) Division of application No. 13/170,806, filed on Jun. 28, 2011, now Pat. No. 8,576,756.

(51) Int. Cl.
| | |
|---|---|
| *H04L 12/26* | (2006.01) |
| *H04W 8/14* | (2009.01) |
| *H04W 4/18* | (2009.01) |
| *H04W 36/02* | (2009.01) |
| *H04L 29/08* | (2006.01) |

(52) U.S. Cl.
CPC .............. *H04W 8/14* (2013.01); *H04L 67/288* (2013.01); *H04L 67/2852* (2013.01); *H04W 4/18* (2013.01); *H04W 36/023* (2013.01)

(58) Field of Classification Search
CPC ..... H04W 80/04; H04W 84/12; H04W 88/06; H04W 88/08; H04W 84/18; H04W 36/18; H04W 36/0011; H04W 36/14; H04W 36/08
USPC ....................... 370/349, 331, 310.2, 328, 338; 455/437–444
See application file for complete search history.

(56) References Cited

U.S. PATENT DOCUMENTS

| | | | |
|---|---|---|---|
| 6,907,501 B2 | 6/2005 | Tariq et al. | |
| 7,020,464 B2 | 3/2006 | Bahl et al. | |
| 7,107,055 B2 | 9/2006 | Gallagher et al. | |
| 7,260,082 B2 | 8/2007 | Yarlagadda | |

(Continued)

OTHER PUBLICATIONS

Ding, et al., "Adaptive Generation of Caching in Cellular Mobile Networks"; Department of Computer Science and Technologym Huazhong University of Science and Technology; Department of Computer Science and Technology, South-Central University for Nationalities, Wuhan, Hubei, P.R. China; Copyright 2007 IEEE; pp. 2992-2995.

(Continued)

*Primary Examiner* — Brenda H Pham
(74) *Attorney, Agent, or Firm* — Cantor Colburn LLP

(57) ABSTRACT

A technique for transmitting an object to a mobile device is provided. In response to the mobile device moving from a first area serviced by a first cache to a second area serviced by a second cache, the first cache transmits the object stored in the first cache to the second cache. The first cache transmits instructions to the second cache that cause the second cache to forward the object to the mobile device in the second area.

9 Claims, 10 Drawing Sheets

(56) References Cited

U.S. PATENT DOCUMENTS

| | | | |
|---|---|---|---|
| 7,394,788 | B2 | 7/2008 | Kim et al. |
| 7,436,796 | B2 * | 10/2008 | Takeuchi et al. ............. 370/328 |
| 7,656,841 | B2 | 2/2010 | Brouet et al. |
| 7,953,042 | B2 | 5/2011 | Kwak et al. |
| 8,576,756 | B2 * | 11/2013 | Ko et al. .................... 370/310.2 |
| 2003/0087646 | A1 | 5/2003 | Funato et al. |
| 2004/0255331 | A1 | 12/2004 | Inoue et al. |
| 2005/0102300 | A1 | 5/2005 | Madsen |
| 2005/0286466 | A1 | 12/2005 | Tagg et al. |
| 2008/0137615 | A1 | 6/2008 | Park et al. |
| 2008/0207200 | A1 | 8/2008 | Fein et al. |
| 2008/0310365 | A1 | 12/2008 | Ergen et al. |
| 2008/0318576 | A1 | 12/2008 | So et al. |
| 2009/0156210 | A1 | 6/2009 | Ponce De Leon et al. |
| 2009/0238140 | A1 | 9/2009 | Kojima |
| 2009/0275344 | A1 | 11/2009 | Carlson et al. |
| 2010/0034089 | A1 | 2/2010 | Kovvali et al. |
| 2010/0130212 | A1 | 5/2010 | So et al. |
| 2010/0150108 | A1 | 6/2010 | Aghvami et al. |
| 2012/0300747 | A1 * | 11/2012 | Westberg et al. ............. 370/331 |

OTHER PUBLICATIONS

Wang, et al., "On Cache Prefetching Strategies for Integrated Infostation-Cellular Network"; School of Computer Science & Engineering, University of New South Wales, Sydney, Australia; Intel Asia Pacific Research and Development, Shanghai, China; Copyright 2006 IEEE; pp. 185-192.

Notification of Transmittal of the International Search Report and the Written Opinion of the International Searching Authority; International application No. PCT/US2012/038949; filing date: May 22, 2012; date of mailing: Aug. 27, 2012; applicant's file reference: 11 pages.

Written Opinion of the International Searching Authority for International Application No. PCT/US2012/038949; filing date: May 22, 2012; applicant's file reference: date of mailing: Aug. 27, 2012; 7 pages.

International Preliminary Report on Patentability including Transmittal; International Application No. PCT/US2012/038949 filing date May 22, 2012; Date of mailing Jan. 16, 2014; pp. 1-9.

* cited by examiner

CONTINUOUS CACHE SERVICE IN CELLULAR NETWORKS

CROSS REFERENCE TO RELATED APPLICATIONS

The present application is a divisional of U.S. patent application Ser. No. 13/170,806, entitled "CONTINUOUS CACHE SERVICE IN CELLULAR NETWORKS", filed on Jun. 28, 2011, which is incorporated herein by reference in its entirety.

BACKGROUND

Exemplary embodiments relate to communications, and more specifically, to communications in networks.

A cellular network is a radio network distributed over land areas called cells, each served by at least one fixed-location transceiver known as a cell site or base station. When joined together these cells provide radio coverage over a wide geographic area. This enables a large number of portable transceivers (e.g., mobile phones including smart phones and mobile computers) to communicate with each other and with fixed transceivers and telephones anywhere in the network, via base stations, even if some of the transceivers are moving through more than one cell during transmission.

Today, 3G networks (and 4G networks) offer high-speed data transfer. This allows for a variety of cell phone features, such as high-speed internet, audio and video streaming, and even video conferencing. 3G networks employ various wireless technologies, such as W-CDMA, Wi-MAX, CDMA (code division multiple access) 2000, EDGE (enhanced data rates for GSM (global system for mobile communications) evolution or enhanced data rates for global evolution), etc.

BRIEF SUMMARY

According to an exemplary embodiment, a method for transmitting an object to a mobile device is provided. In response to the mobile device moving from a first area serviced by a first cache to a second area serviced by a second cache, the first cache transmits the object stored in the first cache to the second cache. The first cache transmits instructions to the second cache that cause the second cache to forward the object to the mobile device in the second area.

According to an exemplary embodiment, a method for transmitting an object to a mobile device is provided. In response to the mobile device moving from a first area serviced by a first cache that stores a same object to a second area serviced by a second cache, the second cache receives a transmission context of the same object from the first cache. The second cache locally stores the same object as the first cache. The second cache transmits the same object locally stored in the second cache to the mobile device in the second area according to the transmission context received from the first cache.

According to an exemplary embodiment, a system for transmitting an object to a mobile device is provided. The system includes a network, and a first cache configured to communicate over the network and store the object. In response to the mobile device moving from a first area serviced by the first cache to a second area serviced by a second cache, the first cache is configured to transmit the object stored in the first cache to the second cache. The first cache is configured to transmit instructions to the second cache that received the object from the first cache in which the instructions cause the second cache to forward the object to the mobile device in the second area.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Figure 10:
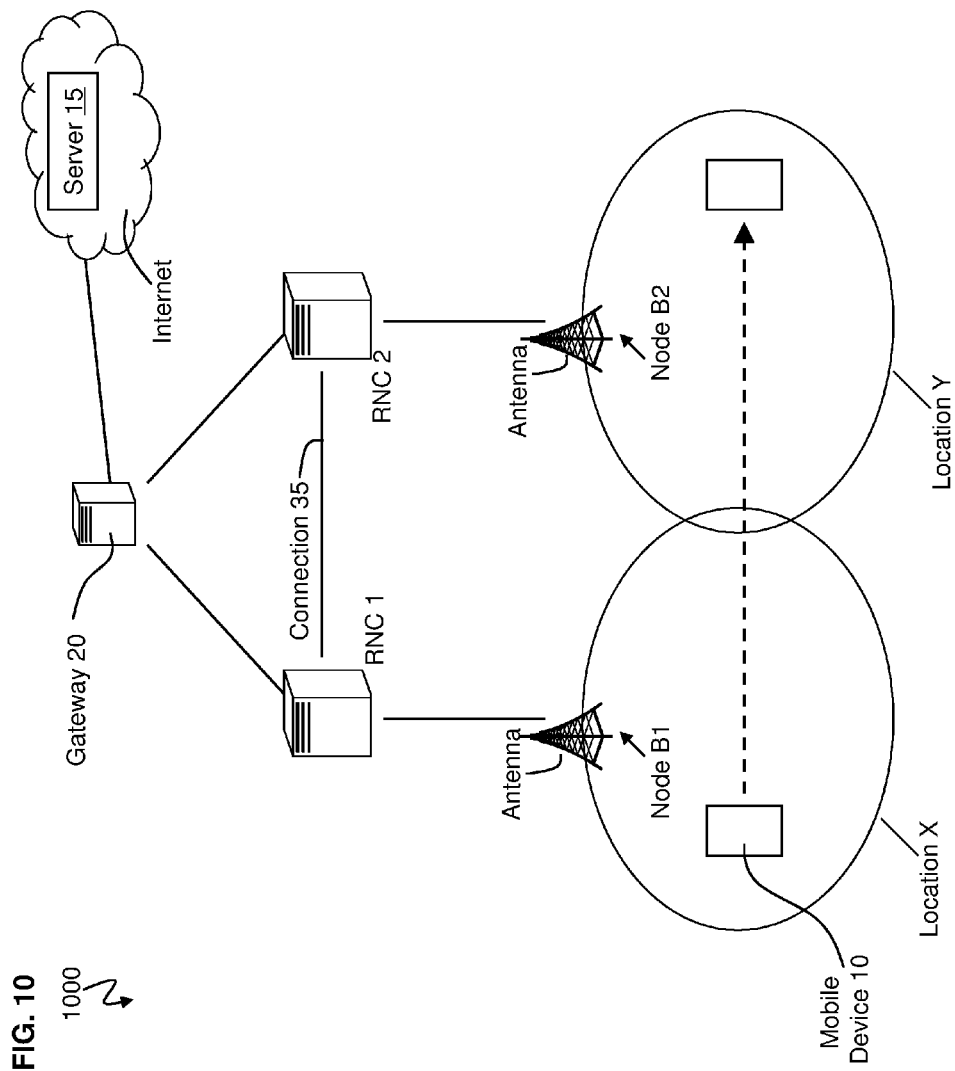
FIG. 10 depicts a 3G cellular network system that provides mobile devices with communication services.

A 3G cellular network 1000 may consists of various devices, organized in a hierarchical structure, such as the one depicted in FIG. 10. In FIG. 10, a mobile device 10 (e.g., cellular phone, smart phone, etc.), called mobile station (MS) or user equipment (UE) depending on particular cellular network standard, is connected to one or a few base stations over the wireless communication links A base station (BS), sometimes called base transceiver system (BTS) in CDMA2000 or NodeB in UMTS (Universal Mobile Telecommunications System), is responsible for serving multiple mobile devices over the wireless links, and a BS itself is connected to and under the control of a base station controller (BSC), also called RNC (Radio Network Controller) in UMTS. A RNC (or BSC) is responsible for controlling multiple NodeB's (BTS's), and a RNC itself is connected to and under the control of gateway nodes in the core network of the cellular network. A RNC often maintains communication links to other RNCs. The gateway nodes are responsible for controlling multiple RNC's and for sending data traffic from/to mobile devices to/from public networks (e.g., the internet). Depending on the particular cellular network architecture, a RNC is controlled by the multiple gateway nodes (e.g., serving general packet radio service (GPRS) support node (SGSN) and gateway GPRS support node (GGSN) in UMTS)

or the RNC is controlled by a single device (e.g., packet data serving node (PDSN) in CDMA2000).

In cellular network terminologies, the mobile devices, base stations, and radio network controllers constitute together a sub-system referred to as radio access network (RAN), while the subsystem of gateway nodes is referred to as core network (CN). Under the above architecture, the mobile device 10 can then communicate with devices in the public network through devices in RAN and CN to, for instance, retrieve contents (e.g., files, streaming videos, software applications, etc.) from a server 15 in the internet. Furthermore, the hierarchical structure of the cellular networks enable the mobile devices to seamlessly retrieve the contents from the servers (such as the server 15) in the internet even when the mobile devices move from a location covered by a base station to another location covered by another base station.

With the proliferation of high-speed wireless cellular access networks (such as, e.g., W-CDMA (wideband code division multiple access) and UMTS (universal mobile telecommunications system)) and high-end cellular user devices (e.g., smart phones, tablet PCs, etc.) supporting Internet Protocol (IP) applications, mobile network operators are increasingly faced with aggregate traffic demands requiring high-bandwidth within their backhaul network links (also referred to as radio access network) and within their core networks. In wired networks, caching the contents in the application layer (e.g., data retrieved through http request-response) at the edge of the network near the end users is an effective solution and serving the users locally (with a local server instead of serving the contents from distant servers having the original content) not only reduces the load in the back-end networks, but also improves the end-users' experience in terms of reduced delay.

In accordance with exemplary embodiments, an approach discussed herein provides the effect of having the cache servers within the radio access network (RAN) of the cellular network, i.e., at the base stations (BS) or at the base station controller (BSC) in the cellular networks, where the end-users can move from within the coverage of a base station to that of other base stations. In some cases, base stations (BS) may be referred to as base transceiver stations (BTS) in GSM and CDMA2000, NodeB in UMTS, eNodeB in LTE (long term evolution), and so forth; also, base station controller (BSC) may be referred to as RNC (Radio Network Controller) in UMTS. A subsystem comprised of BS and BSC may also be referred to as BSS (base station subsystem) or RAN (Radio Access Network). It is understood that the cache server at a particular cellular network device (e.g., BS or RNC) can be implemented as a computation and storage element within the that cellular network device, as a separate device connected to the cellular network device through a communication link between them, and/or as the combination of the above. We herein use the terms "cache server at device X" or "cache at X" (e.g., cache at BS) to refer to any possible implementation of the cache server co-located with some network device X.

The following scenario is illustrated for explanation purposes and not limitation. Suppose a mobile user connected to a base station, BS1, in a cellular network, requested content (e.g., html file, video file, audio file, audio/video file, etc.) from a server in the internet using HTTP (Hypertext Transfer Protocol) request on top of a TCP/IP protocol. The cache server at BS1, acting as a proxy server, terminates the user's TCP/IP connection, intercepts the HTTP request, and, if it has a copy of the requested content, the BS1 starts to send the content to the requesting user using HTTP response on top of the TCP/IP connection to the user (otherwise the BS1 forwards the request to the upstream nodes towards the server of the original copy). Now, while receiving the content with the TCP connection open, the user of the mobile device moves to a new base station, BS2, making the user unable to continue to receive the content from the cache server at BS1.

The cache server at BS2, neither aware of the TCP connection state nor the content sent on the TCP connection, will be unable to serve the mobile user, whether or not the cache server at BS2 has a copy of the same content that the user has started receiving from the cache at BS1. Even if BS2 simply forwards all (unknown) TCP packets received from the user to the server (in the internet) of the original copy, the original server cannot determine the context of the TCP packets either, thus making the user unable to continue to receive the requested content. It is understood that the use of HTTP and TCP/IP in the above scenario is for explanation purpose only, and similar scenarios involving other session-layer and transport-layer protocols, such as RTSP (Real-Time Streaming Protocol), RTP (Real-time Transport Protocol), UDP (User Datagram Protocol), etc., are equally applicable for illustrative examples.

Exemplary embodiments are configured to provide techniques that can seamlessly serve the cached contents to the mobile users in the above situation, similar situations, and other situations. For example, if the same content exists in the cache server at the new location (connected to and/or associated with the new base station) of the mobile user, the cache at the old location (connected to and/or associated with the old base station) sends the identifier of the contents and the current transmission protocol state to the new cache so that the new cache can serve the user from its local storage. On the other hand, if the same content does not exist in the cache at the new location of the mobile user, the cache at the old location discovers the new location and continues to send the content from its local storage to the mobile user along the path formed with other caches.

Also, exemplary embodiments are configured to detect the user mobility status of the user. For example, upon the cache at the new location receiving packets with unrecognized transmission context (e.g., normal TCP packets without SYN, TCP ACK, etc. which are unknown to the old base station), the cache at the new location of the mobile user discovers (e.g., sends discovery requests to discover) the cache at the old location of the user; and if the old cache is discovered, the new cache requests that the transmission context and/or the content be sent from the discovered old cache to the new cache. In another example, upon the old cache detecting the user's handover to another location, the cache at the old location of the user discovers (sends discovery request to discover) the new cache at the new location; if the new cache is discovered, the old cache sends the transmission context or the contents to the new cache.

In accordance with exemplary embodiments, caches (e.g., cache servers) can form an overlay network on top of existing cellular network elements. The caches can communicate with one another using existing cellular network protocols to acquire the data channels and bandwidth between cellular network elements to exchange information related to discovery and delivery of the cached content between the caches. Particularly, the processes are transparent to mobile users and to mobile network infrastructure.

Figure 1:
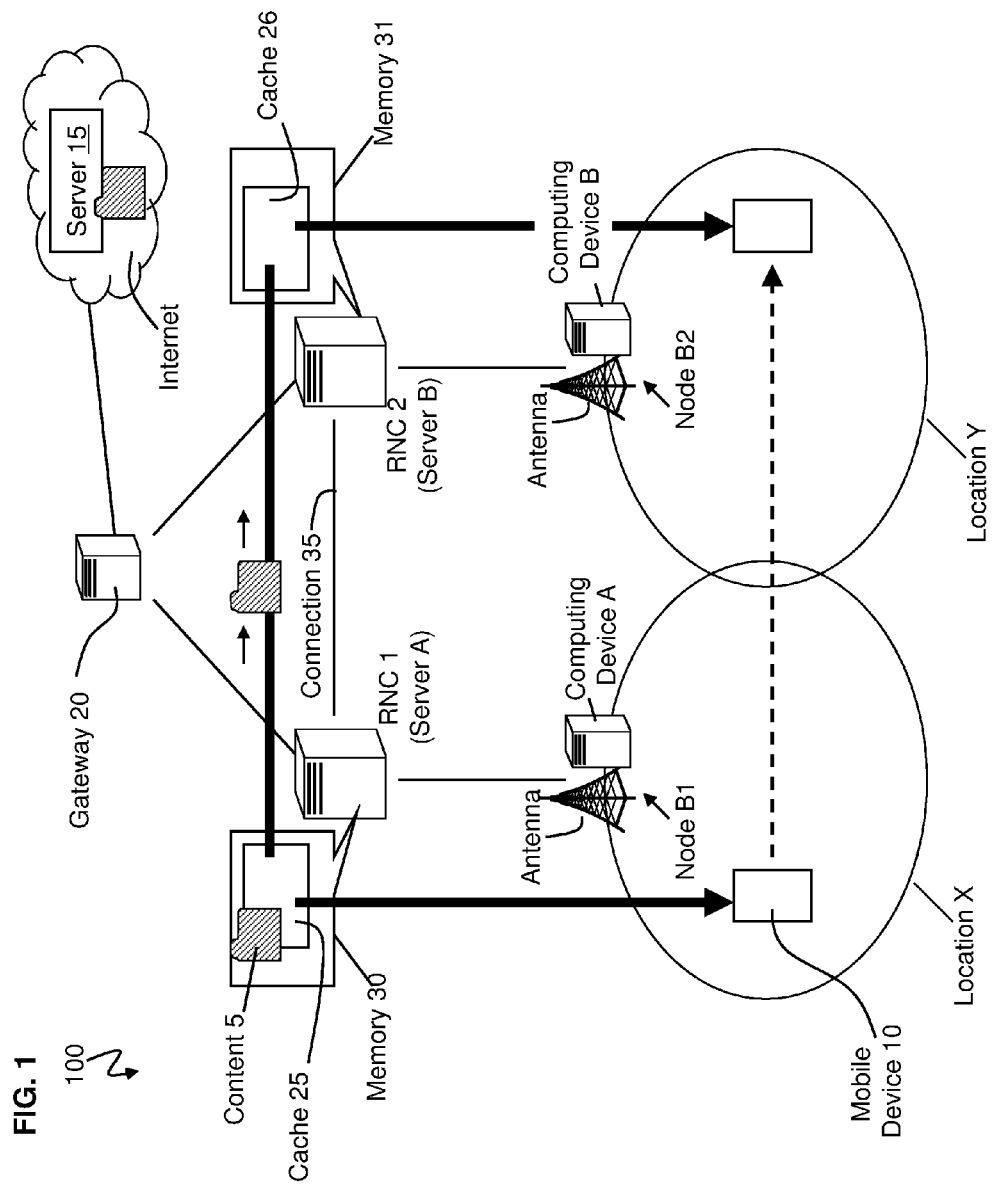
FIG. 1 depicts a system for a continuous cache content service according to an exemplary embodiment.
Figure 2:
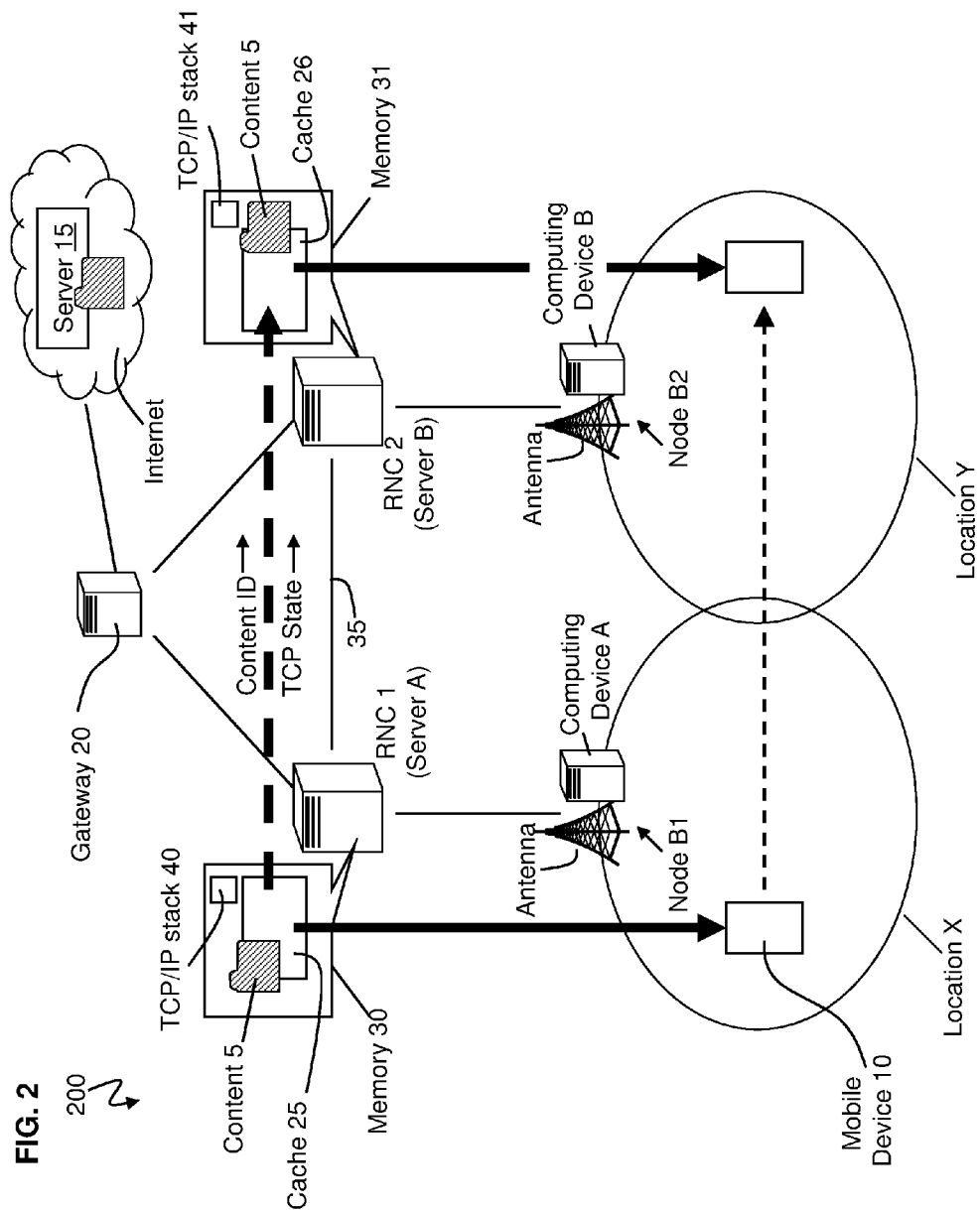
FIG. 2 depicts a system for a continuous cache content service according to an exemplary embodiment.

Now, turning to the figures, FIGS. 1 and 2 depict continuous cache content service when cache servers are deployed at RNCs where a direct communication link (e.g., IP connection 35) exists between the caches according to an exemplary embodiment. In FIG. 1, a system 100 includes a plurality of RNC's such as RNC1 and RNC2. Each RNC such as RNC1 and RNC2 includes communication equipment as well as computing devices (e.g., a cache server) included in or attached to it, having hardware and software. Also, each NodeB such as NodeB1 and NodeB2 includes communication device connected to an antenna and is connected to RNC1 and RNC2, respectively. In this embodiment, each NodeB simply acts as a normal relay device that forwards the data traffic between mobile device(s) and the RNC that it is connected to.

The mobile device 10 (such as a smart phone/cellular phone) is initially within location X, which in this example is serviced by NodeB1, which in turn is under the control of RNC1. The user of the mobile device 10 then moves to location Y, which in this example is serviced by NodeB2, which is in turn under the control of RNC2. However, while still in location X serviced by NodeB1, the mobile device 10 has requested content 5 from a server 15, e.g., on the internet; the server 15 may represent one or more servers operating on the internet. To implement this request from the mobile device 10, the NodeB1 is configured to relay this request for the content 5 to a radio network controller (RNC1) (also referred to as a base station controller). The cache server A at RNC1 is configured to intercept the request for the content 5 sent by the mobile device 10.

If the content 5 is not stored at its local cache 25 in memory 30, the RNC1 is configured to request the content 5 from the server 15 via a gateway 20. The gateway 20 represents the hardware and software to operate, e.g., as a SGSN (serving GPRS (general packet radio service) support node) and a GGSN (gateway GPRS support node) in UMTS, and is configured to forward the data from/to RNCs under its control and to/from the servers in the internet. When RNC1 receives the content 5 from the server 15 via the gateway 20, the RNC1 may store/cache the content 5 at its local cache 25; the RNC1 transmits the content 5 to the NodeB1, which in turn relays the content 5 to the mobile device 10.

When RNC1 receives the request for the content 5 from the mobile device 10, the content 5 may exist in the RNC1's local cache 25, because the same content 5 was requested by some other mobile device, received from the server 15, and was stored in the local cache 25. In such a case, the RNC1 begins transmitting the cached content 5 toward the mobile device 10, and NodeB1 begins relaying the content 5 from the RNC1 to the mobile device 10.

In this example, when the NodeB1 is transmitting (i.e., relaying) the content 5 to the mobile device 10, the mobile device 10 moves to location Y serviced by NodeB2 which is connected to and under the control of RNC2. In the transition to location Y, NodeB1 and hence RNC1 hand off (hand over) service of mobile device 10 to the NodeB2 and RNC2. Because in location Y (in this example), the NodeB1 may no longer have the range/ability to communicate with the mobile device 10, the NodeB2 and RNC2 will now begin servicing the mobile device 10. However, RNC1 and NodeB1 have not completed transmitting content 5 to the mobile device 10 before the mobile device 10 is out of range (i.e., in location Y covered by NodeB2 and RNC2).

When the mobile device 10 is handed off to a location served by RNC2, the RNC1 is configured to forward the content 5 cached in the cache 25 to the RNC2 (e.g., cache server B), along with information identifying the mobile device 10 and transmission context (which includes content identification and TCP/IP state). While the mobile device 10 is in the coverage of location Y, the RNC2 transmits the content 5 to the mobile device 10 (according to instructions) via the NodeB2, without the RNC2 having to (re)request the content 5 again from server 15 on the internet. The RNC1 and RNC2 are connected by an IP connection 35 and can communicate with one another over the IP connection 35.

In one implementation, the RNC2 may receive the content 5 from RNC1 and store the content 5 in a cache 26 in memory 31. The RNC2 can then transmit the content 5 to the NodeB2, and the NodeB2 can relay the content 5 to the mobile device 10 covered in the location Y. Additionally, and/or alternatively, in another implementation, the RNC2 can receive the content 5 from the RNC1 without caching the content 5 in its cache 26. Accordingly, the RNC2 can forward the content 5 to the mobile device 10 via NodeB2. It is contemplated that the implementations may be combined to provide the content 5 to the mobile device 10 in any manner as desired.

Each NodeB (such as NodeB1 and NodeB2) is each configured to simultaneously service numerous mobile devices within its respective range (e.g., location X or Y), although only one mobile device 10 is shown for conciseness. It is understood that maintaining a continuous cache as discussed herein is not limited to a single mobile device 10 but applies for numerous mobile devices 10. Also, each RNC such as the RNC1 and RNC2 (along with RNC3 in FIGS. 3 and 4) is each configured to simultaneously manage and control numerous NodeBs and is not limited to a single NodeB.

Note that radio network controller (RNC) is a governing element in the UMTS radio access network and is responsible for controlling the NodeBs that are connected to it. The RNC carries out radio resource management, performs mobility management functions, and is the point where encryption is done before user data is sent to and from the mobile device. The RNC connects to the circuit switched core network through, e.g., media gateway (MGW) and to the SGSN (Serving GPRS Support Node) in the packet switched core network.

When stored/cached, the content 5 may be one or more data objects. Examples of the objects include video and audio content, audio content, video content, media, a file, a download, streaming content, gaming content, a software application, and the like.

Turning to FIG. 2, there is shown a system 200 for content transmission context in which a new cache also contains the content according to an exemplary embodiment.

As discussed in FIG. 1, the mobile device 10 is initially in location X serviced by NodeB1, and the mobile device 10 moves to location Y serviced by NodeB2. Similarly, the mobile device 10 has requested content 5 at the server 15 via the NodeB1, and the NodeB1 forwards the request to the RNC1. The RNC1 receives the request from the NodeB1, and either (i) requests the content 5 from the server 15 on the internet via the gateway 20, receives the content 5 from the server 15, and may store the content 5 in its local cache 25, and/or (ii) retrieves the content 5 from its local cache 25. The RNC1 then starts transmitting the content 5 to the mobile device 10 via NodeB1. As mentioned above, the RNC1 and RNC2 may include the hardware and software of and/or may be cache servers A and B respectively.

When RNC1 begins transmitting the content 5 to the mobile device 10 in the coverage location X, the RCN1 transmits the content 5 on a transport protocol connection, such as TCP/IP. The RNC1 and RNC2 may each respectively include a TCP/IP stack 40, 41 (i.e., software applications for implementing TCP protocols and IP protocols as understood by one skilled in the art). When the RNC1 is transmitting the packets of content 5 to the mobile device 10, the mobile device 10 moves to NodeB2 covering location Y. In the transition to the location Y, NodeB1/RNC1 hands off service of mobile device 10 to the NodeB2/RNC2. In this case, the new cache (e.g., cache 26) of the RNC2 has also stored the same content 5 that is stored in the old cache (e.g., cache 25) of RNC1. For example, the content 5 may have been stored in memory 31 for a previous mobile device that was in the location Y serviced by NodeB2. Since the content 5 is already stored in the cache 26 in memory 31 of RNC2, the RNC1 forwards the transmission context for the transmission of the packets for content 5 which occurred before this transmission was interrupted. As such, RNC1 does not need to transmit the content 5 itself to the RNC2, since RNC2 stores its own copy (e.g., in memory 31 in cache server B). The RNC2 receives the transmission context corresponding to the uncompleted transfer of the content 5 from RNC1. The transmission context for the content 5 may include a content ID (which may be the URL (Uniform Resource Locator) identifying (corresponding) the location of the requested content 5 used in HTTP protocol), the offset location (e.g., byte counts from the beginning of the file) of the contents that RNC1 left off (from), the TCP state/transmission state (which may be the sequence numbers of the packets that constitute the content 5), and/or the identifier of the mobile device 10, such as the phone number, IP address and port number of the mobile device, and/or international mobile subscriber identity (IMSI). In one implementation, the TCP state sent from the RNC1 to the RNC2 may include the last packet sequence number acknowledged as being successfully received by the mobile device 10, the last group of packet sequence numbers acknowledged as being successfully received by the mobile device 10, and/or all of the packet sequence numbers acknowledged as being successfully received by the mobile device 10; in any of the examples, the packet sequence numbers may not have been acknowledged as received by the mobile device 10. The TCP state of the content 5 may correspond to the incomplete transfer of packets (constituting the content 5) started during the transmission from RNC1 to mobile device 10 (in the location X) but interrupted when the mobile device 10 moved into location Y serviced by RNC2. For the content 5, the TCP state provides the current state of the transfer from RNC1 to mobile device 10. In one case, the TCP state may indicate that all packet sequence numbers have been received (acknowledged) by the mobile device 10, and/or that all but the last group (e.g., 10, 20 ... 50, 60) of packet sequence numbers have been received (acknowledged) by the mobile device 10 while in location X covered by RNC1.

In response to receiving the transmission context for the incomplete transfer of the content 5, the RNC2 transfers (according to the transmission context) the content 5 locally stored in its cache 26 to the mobile device 10 now serviced by NodeB2 covering location Y without having to request that the content 5 from the server 15 or from RNC1. The RNC2 may instruct (push) the NodeB2 to transfer the locally stored content 5 to mobile device 10, and/or the NodeB2 may request (pull) the content 5 from the RNC2 to send to the mobile device 10.

In one implementation, the TCP/IP stack 41 of the RNC2 may receive and utilize the TCP state (i.e., transmission state) to continue transferring the packets of the content 5 from where the TCP/IP stack 40 of the RNC1 left off (before being interrupted). For example, the TCP/IP stack 41 may be configured to continue transferring the packets of the content 5 at the last packet sequence number successfully acknowledged by the mobile device 10 and/or a few packets (e.g., 5, 10, 15 ... 30, etc.) before the last packet sequence number. Additionally and/or alternatively, the TCP/IP stack 41 may retransfer all of the packets constituting the content 5 including the packet sequence numbers successfully acknowledged by the mobile device 10 and/or may retransfer a part of the packet sequence numbers successfully acknowledged by the mobile device 10. Further, additionally and/or alternatively, in one implementation, the TCP/IP stack 40 in RNC1 may be configured to instruct the TCP/IP stack 41 in RNC2 to start transmitting the packets of the content 5 at a certain (identified) packet sequence number.

Also, if both the content 5 (packets not acknowledged as being received by the mobile device 10 in NodeB1) and the transmission context are sent from the RNC1 because the RNC2 did not locally store the content 5, the TCP/IP stack 41 in the RNC2 is configured to transfer the packets constituting content 5 according to the transmission context (i.e., the TCP state), e.g., such that all of the packets do not need to be retransmitted to the mobile device 10 and/or such that only the unacknowledged packet sequence numbers are transmitted to the mobile device 10 in NodeB2.

Figure 3:
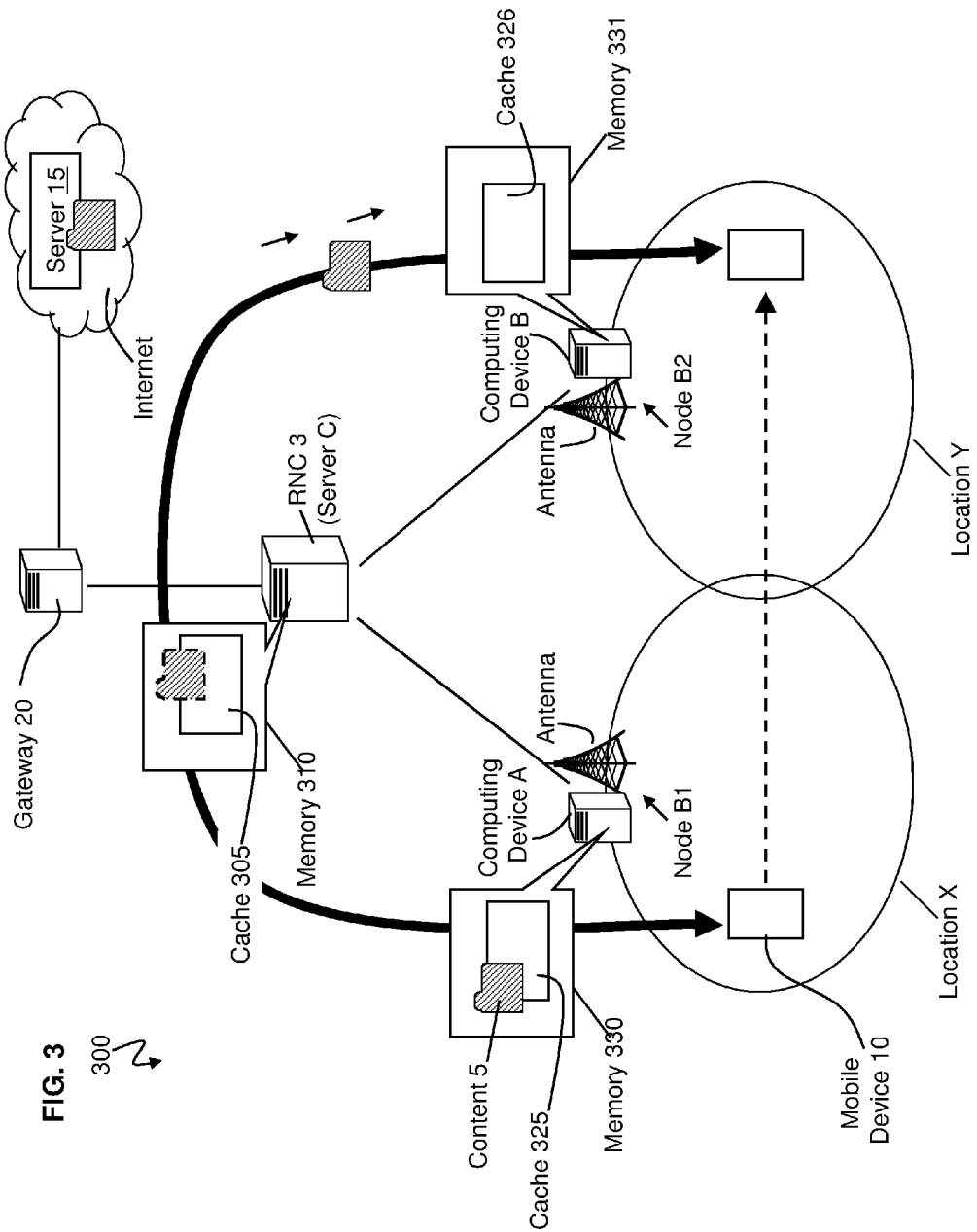
FIG. 3 depicts a system for cache content service in accordance with an exemplary embodiment.
Figure 4:
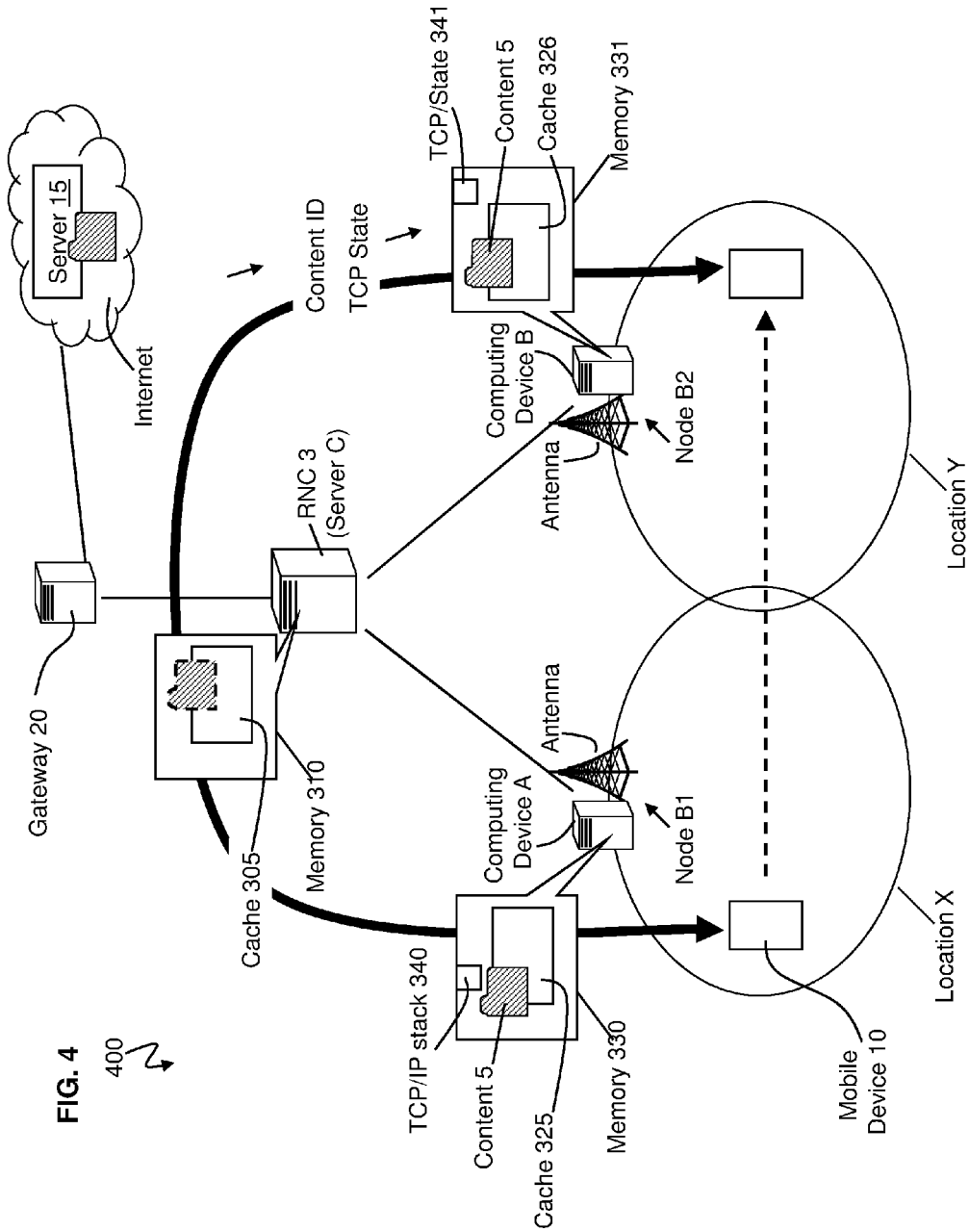
FIG. 4 depicts a system for cache content service in accordance with an exemplary embodiment.

FIGS. 3 and 4 depict cache content service when a direct link may not exist between the caches in accordance with an exemplary embodiment. In this embodiment, each NodeB such as NodeB1 and NodeB2 includes communication equipment as well as computing devices (including a cache server) having hardware and software, and the NodeB's are connected to and controlled by the RNC3. Additionally, RNC3 also includes communication equipment as well as computing devices including a cache server. As discussed above, the mobile device 10 is moving from location X serviced by a cache server at NodeB1 to location Y serviced by a cache server at NodeB2 while NodeB1 has not completed the process of transmitting packets of content 5 to the mobile device 10. The details discussed for FIGS. 1 and 2 can apply to FIGS. 3 and 4 but all details are not repeated for the sake of brevity.

A system 300 in FIG. 3 includes a RNC3 that services NodeB1 and NodeB2, along with other NodeBs not shown. The NodeB1 may include a computing device A with a cache 325 in memory 330 that stores the content 5. The NodeB2 may include a computing device B with a cache 326 in memory 331, and the cache 326 (initially) may not contain the content 5. The NodeB1 may receive the content 5 from the server 15 via the gateway 20 and the RNC3 (e.g., cache server C) as discussed for FIGS. 1 and 2.

When the mobile device 10 moves from being serviced by the NodeB1 to the NodeB2, the NodeB1 is in the process of transferring the content 5 to the mobile device 10. Since the NodeB1 stores the content 5 in its own cache 325, the NodeB1 transfers the content 5 (e.g., a copy) from the cache 325 to the cache 326 in the memory 331 of the NodeB2 via the common RNC3. The NodeB2 may optionally cache a copy of the content 5 before and/or while forwarding to the mobile device 10 in location Y. Likewise, the RNC3 may optionally store a copy of the content 5 before forwarding to NodeB2, and/or the RNC3 may have previously cached a copy of the content 5 in cache 305 of memory 310. As such, the NodeB1 can instruct or cause the RNC3 to forward its locally stored content 5 in cache 305 to the NodeB2.

In one implementation, the NodeB2 may request that the RNC3 retrieve a copy of the content 5 from the cache 325 in NodeB1, e.g., after receiving handover information for the mobile device 10 from NodeB1. Additionally and/or alternatively, in another implementation, the NodeB1 may instruct or cause the RNC3 to forward (relay) a copy of the content 5 from the cache 325 to the NodeB2 so that the NodeB2 can transmit the content 5 to the mobile device 10. The RNC3 may optionally cache a copy of the content 5 for itself in the cache 305 in memory 310 of the RNC3 before and/or while forwarding the content 5 to the NodeB2. Also, the NodeB2 may receive transmission context information for the content 5 (e.g., without receiving the content 5) from NodeB1 via the RNC3; accordingly, the NodeB2 may then request (pull) a copy of the content 5 from the cache 325 in NodeB1 via the RNC3 and/or request a copy of the content 5 from the cache 305 if already stored by the RNC3.

Referring now to FIG. 4, FIG. 4 depicts the transfer of content transmission context from one NodeB to another NodeB according to an exemplary embodiment. In a system 400, the content 5 is stored in the cache 325 in the NodeB1 and is also stored in the cache 326 in the NodeB2. When the mobile device 10 is being handed off from the NodeB1 servicing location X to the NodeB2 servicing location Y, the NodeB1 transmits transmission context for the content 5 to the NodeB2. As discussed above, the transmission context (information) may include the content ID and TCP state which provides information about the incomplete process of the NodeB1 sending packets constituting the content 5 to the mobile device 10. For example, a TCP/IP stack 340 in NodeB1 may transmit the transmission context (corresponding to the incomplete transfer of content 5 by NodeB1 to NodeB2) to a TCP/IP stack 341 in NodeB2. Although not repeated, various discussions for TCP/IP stack 40, 41 may apply to the TCP/IP stack 340, 341 respectively.

In one implementation, the TCP/IP stack 341 of the NodeB2 may receive and utilize the TCP state (information) to continue transferring the packets of the content 5 from where the TCP/IP stack 340 of the NodeB1 left off (before being interrupted). For example, as discussed above, the TCP/IP stack 341 may be configured to continue transferring the packets of the content 5 at the last packet sequence number successfully acknowledged by the mobile device 10 and/or a few packets (e.g., 5, 10, 15 . . . 30, etc.) before the last packet sequence number successfully acknowledged. Additionally and/or alternatively, the TCP/IP stack 341 may retransfer all of the packets constituting the content 5 including the packet sequence numbers successfully acknowledged by the mobile device 10 and/or may retransfer a part of the packet sequence numbers successfully acknowledged by the mobile device 10. Further, in one implementation, the TCP/IP stack 340 in NodeB1 may be configured to instruct the TCP/IP stack 341 in NodeB2 to start transmitting the packets of the content 5 at a certain (identified) packet sequence number.

NodeB1, NodeB2, RNC1, RNC2, and RNC3 are all configured with software applications (computing instructions) and hardware (including processors, inputs, outputs, etc.) to function and operate as discussed herein. Additionally, NodeB1, NodeB2, RNC1, RNC2, and RNC3 may include any one or more radio frequency transmitter(s), receiver(s), power amplifiers, encoders/decoders, multiplexers/demultiplexers, control functions, etc.

Figure 5:
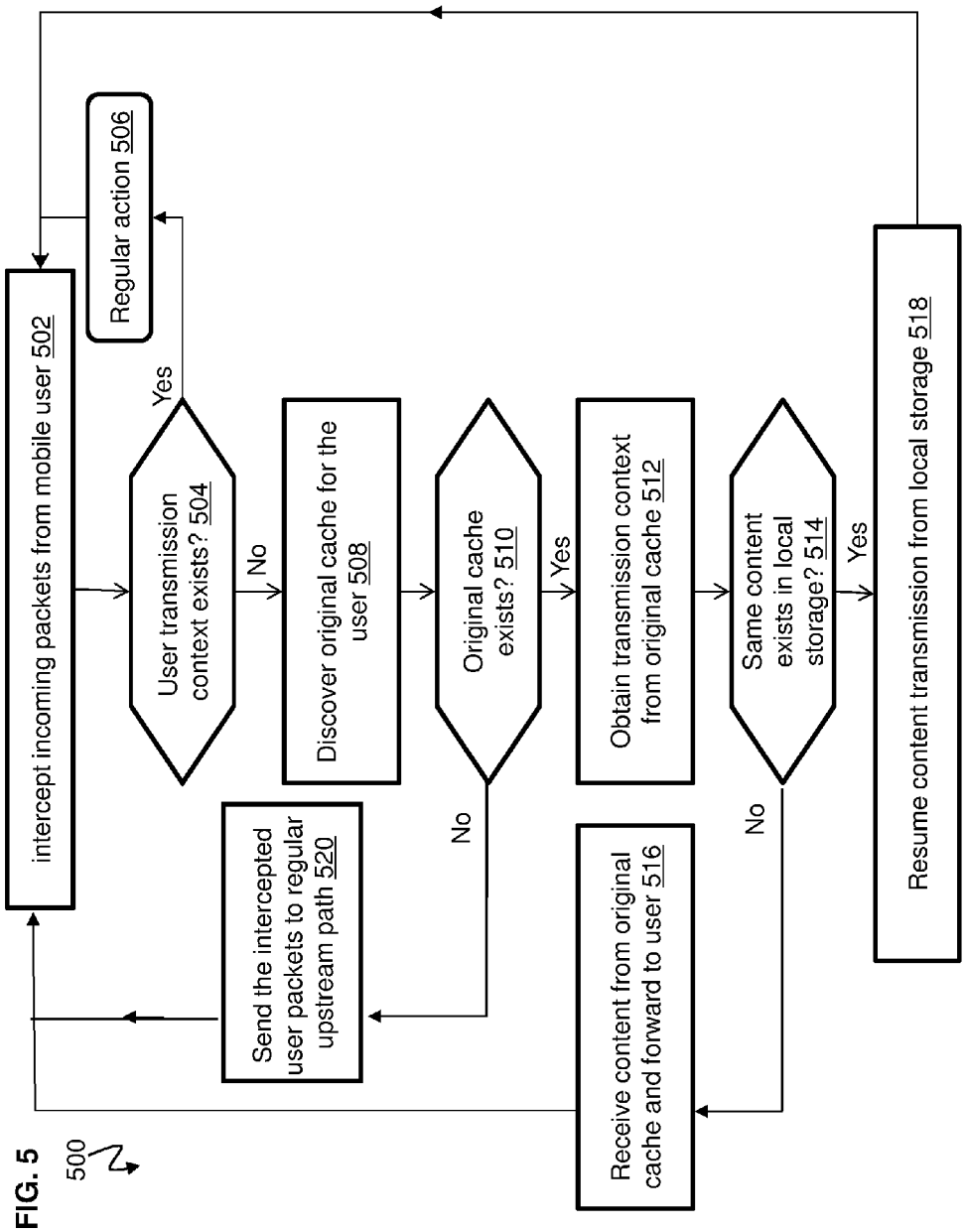
FIG. 5 depicts a flow chart for a mobility support procedure according to an exemplary embodiment.

Turning to FIG. 5, FIG. 5 illustrates a mobility support procedure for a cache server and/or computing device at the target location of the user utilizing the mobile device 10 in flow chart 500 according to an exemplary embodiment.

The mobile device 10 moves from location X serviced by NodeB1 to location Y serviced by NodeB2 (in which NodeB2 is the target location Y), while NodeB1 has not completed transferring the packets of the content 5 to the mobile device 10. The content 5 may be cached (at some point) in the cache 25, 26, 305, 325, 326.

The various operations may be executed by the RNC2 (e.g., cache server B) and/or by the NodeB2 (e.g., computing device B also referred to as a cache server). At times, NodeB2/RNC2 may be utilized to represent operations that can be executed by NodeB2 and/or by RNC2 and may represent that instructions can be passed between the NodeB2 and RNC2 to execute operations. Also, note that any operations performed by RNC2 may be performed by RNC3 (e.g., cache server C) as described in FIGS. 3 and 4.

The NodeB2/RNC2 is configured to intercept incoming packets from the mobile device 10 at block 502. For example, the mobile device 10 may send a request message to continue receiving packets of the content 5, may send a message that the mobile device 10 did not receive the last packets, may send a message that reception of the packets for the content 5 is incomplete, and may send unrecognized transmission context (such as normal TCP packets without SYN, TCP ACK, etc.) that has no basis for identification by the NodeB2, etc. These intercepted incoming packets (related to the content 5) from the mobile device 10 are being sent to NodeB2 with an unknown transmission context.

The NodeB2/RNC2 is configured to determine if user transmission context (information) already exists for this mobile device 10 in its local cache 26, 326 at block 504. If yes, NodeB2/RNC2 continues the normal operation of servicing the mobile device 10 because the existence of the user transmission context indicates that the download of, e.g., the content 5 was while mobile device 10 was in location Y covered by NodeB2.

If no at block 504, the NodeB2/RNC2 is configured to discover the original cache (e.g., cache 25, 325) for the user of the mobile device 10 which contains the content 5 at block 508. This can be accomplished by, e.g., the NodeB2/RNC2 sending and/or the NodeB2 instructing the RNC2 to send discovery request messages (with the user ID, e.g., telephone number) to neighboring caches (e.g., cache servers) in RNCs and NodeBs. The discovery request message causes the neighboring caches (e.g., cache servers) to search their respective cache for the user ID to determine whether the neighboring cache servers/computing devices are servicing (and/or were servicing) the mobile device 10. For example, there may be neighboring cache servers/computing devices in Nodes B(1-N) and/or in RNC (1-N), and the current NodeB2/RNC2 sends the discovery request messages to these neighbors. NodeB(1-N) and/or RNC (1-N) represent numerous NodeBs and RNCs and may be similar to NodeB and RNC described in FIGS. 1-4. Also, for example, NodeB2/RNC2 may send a discovery request message that indicates it is searching to discover any cache (e.g., cache 25 in RNC1 and/or cache 325 in NodeB1), e.g., storing the content 5. NodeB1/RNC1 receives this discovery request message and replies back with a discovery response message indicating that the NodeB1/RNC1 has stored the content 5 in cache 25, 325 (or previously serviced the mobile device 10).

At block 510, NodeB2/RNC2 is configured to determine if the original cache (e.g., cache 25, 325) exists that stored the content 5 at block 510. If no responses are received from neighboring NodeBs and/or RNCs within a certain time period, the NodeB2/RNC2 is configured to send the received incoming packets upstream to the server 15 to request the content 5 again at block 520. In this case, the NodeB2/RNC2 has intercepted communications of the mobile device 10, e.g., asking for the remaining missing packets constituting the content 5. Using the intercepted communication, i.e., intercepted incoming packets from the mobile device 10, the RNC2 can (re)request the content 5 via the gateway 20 from the server 15.

However, if a response is received from RNC1 and/or NodeB1 indicating that they originally cached content 5 because NodeB1 was previously servicing the mobile device 10 (in coverage of location X), the NodeB2/RNC2 obtains (requests) the transmission context from the NodeB1/RNC1 at block 512. For example, the NodeB2/RNC2 is configured to and/or the NodeB2 instructs the RNC2 to request (pull) the transmission context of content 5 from the cache 25, 325 in RNC1 and/or NodeB1 (or from the TCP/IP stack 40, 340).

The transmission content for the content 5 may include the TCP state which is the TCP/IP sequence number(s), the content ID (e.g., the URL to the location of the content 5 on the server 15), and/or the telephone number of the mobile device 10. Using the received transmission context, the NodeB2/RNC2 is configured to determine if the same content 5 is locally stored in the cache 26, 326 in memory 31, 331 of NodeB2 and/or RNC2 at block 514.

If the same content 5 is not locally stored in NodeB2/RNC2, the NodeB2/RNC2 is configured to request and receive the content 5 (e.g., a copy) from NodeB1, RNC1, and/or RNC3, so that NodeB2/RNC2 can forward the content 5 to the mobile device 10 at block 516. If the same content 5 is locally stored in NodeB2/RNC2, the NodeB2/RNC2 is configured to resume transmission of the content 5 from its local cache 26, 326 (from the point or near the point in which NodeB1 left off) at block 518.

Figure 6:
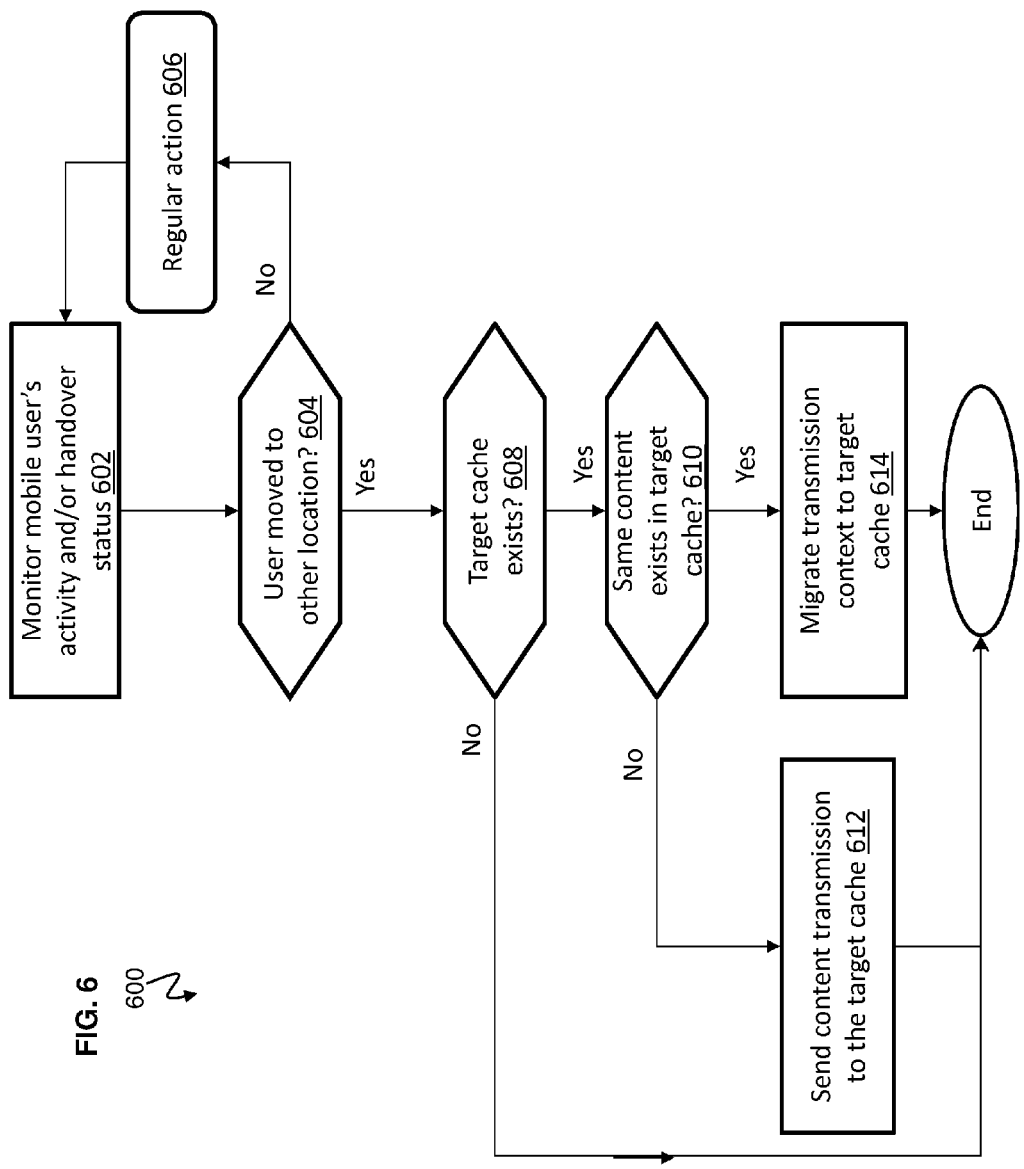
FIG. 6 depicts a flow chart for a mobility support procedure according to an exemplary embodiment.

FIG. 6 illustrates a mobility support procedure for a cache server and/or computing device at the old location of the user utilizing the mobile device 10 in flow chart 500 according to an exemplary embodiment. As discussed above, the mobile device 10 moves from the old location X serviced by NodeB1 to new location Y serviced by NodeB2, while NodeB1 has not completed transferring the packets of the content 5 to the mobile device 10.

The various operations may be executed by the RNC1 (e.g., cache server A) and/or by the NodeB1 (e.g., computing device A also referred to as a cache server). At times, NodeB1/RNC1 may be utilized to represent operations that can be executed by NodeB1 and/or by RNC1. The NodeB1/RNC1 is configured to monitor (i.e., listen) the activity of the mobile device 10 and/or monitor the handover status of the mobile device 10 at block 602.

The NodeB1/RNC1 is configured to determine if the user has moved (or is moving) to a different location (such as to location Y) at block 604. This may be accomplished by NodeB1/RNC1 (or RNC3) monitoring the cellular network handover protocol messages and/or monitoring the inactivity of the (user) mobile device 10 for prolonged (predetermined) period of time. If the mobile device 10 is inactive (e.g., not sending periodic control messages) over a threshold, the NodeB1/RNC1 determines that the mobile device 10 has moved out of location X.

If the NodeB1/RNC1 determines that the mobile device 10 has not moved (e.g., out of coverage location X serviced by NodeB1) in block 604, NodeB1/RNC1 is configured to continue normal action for servicing the mobile device 10 at block 606. Conversely, if the NodeB1/RNC1 determines that the mobile device 10 has moved to a new location (e.g., location Y serviced by NodeB2), the NodeB1/RNC1 is configured to discover the target cache (e.g., cache 326 in the NodeB2, cache 26 in RNC2, and/or cache 305 in RNC3) at the new location that needs the content 5 and/or transmission context for content 5 at block 608. This may be accomplished by the NodeB1/RNC1 (or RNC3) monitoring cellular network handover protocol messages and/or sending discovery request messages to neighboring caches (in which the discovery message indicates that the NodeB1/RNC1 is searching to discover the new cache or NodeB2). The NodeB1/RNC1 (or RNC3) is configured to recognize that it has not completed transferring (all) the packets of the content 5 to mobile device 10 before mobile device 10 moved to the new location Y.

The NodeB2/RNC2 (or RNC3) may receive the discovery request message and recognize that its NodeB2 is now servicing the mobile device 10; the NodeB2/RNC2 (or RNC3) replies back with this information and indicates that it has an available target cache 26, 326. The NodeB1/RNC1 (or RNC3) receives this reply message (via RNC2 and/or RNC3) that the current NodeB2 is now servicing the mobile device 10 along with the available target caches 26, 326 for the new location Y.

If the target cache does not exist or is not discovered, the process ends. When the target cache 26, 326 exists, the NodeB1/RNC1 is configured to determine if the same content 5 exists in the target cache 26, 305 (or 326) at block 610. For example, the NodeB1/RNC1 can send a request (identifying the content 5) to NodeB2/RNC2 asking if the content 5 is cached in cache 26, 305, 326. If NodeB2/RNC2 responds back that the content 5 is not cached, the NodeB1/RNC1 is configured to transmit the content 5 from the cache 25, 305, 325 to the (cache in) NodeB2/RNC2 so that the NodeB2 can complete the transfer of the content 5 to the mobile device 10 at block 612.

When the NodeB2/RNC2 (or RNC3) responds back that the same content 5 already exists in the cache 26, 305, 326, the NodeB1/RNC1 is configured to migrate (transmit) the transmission context (which may correspond to the partial transfer of content 5 in location X) to the NodeB2/RNC2 (RNC3), so that NodeB2 can continue forwarding the packets of the content to the mobile device 10 in location Y at block 614.

Figure 7:
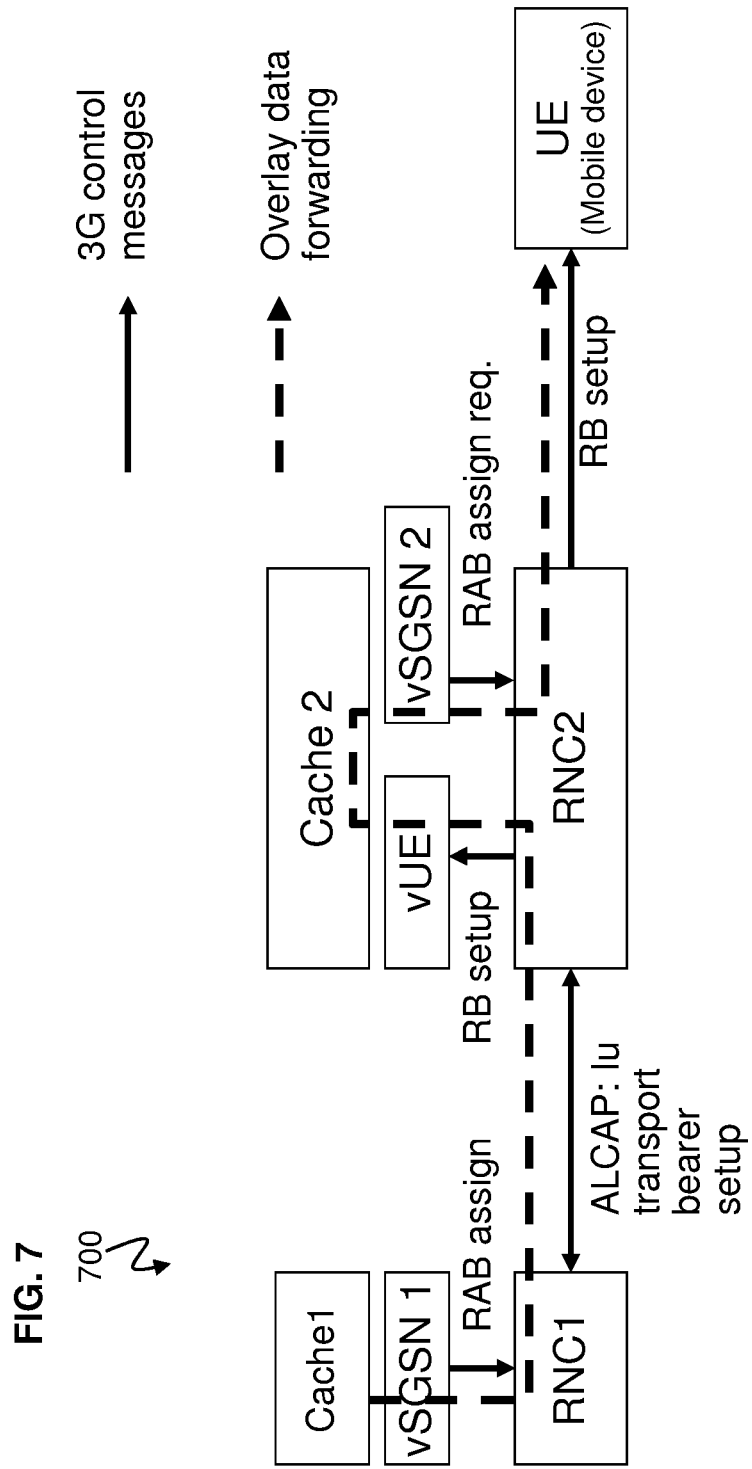
FIG. 7 depicts a diagram of an example overlay network according to an exemplary embodiment.

FIG. 7 depicts a diagram 700 of an example overlay network in a 3G cellular network using virtual network entities according to an exemplary embodiment, such that an overlay network between the devices including cache servers can be constructed using existing cellular network protocols between those devices. Diagram 700 is an overlay network that can apply for FIGS. 1 and 2. Every element in FIGS. 1 and 2 is not shown in the diagram 700 for the sake of conciseness, but it is understood that the missing elements in FIGS. 1 and 2 are incorporated and functionally operate accordingly in FIG. 7. The names of messages and the physical and virtual entities in this embodiment represent the corresponding ones in UMTS, and it is understood similar methods and apparatuses can be used to achieve the same in other cellular network technologies, with the terminologies used herein being replaced by names of corresponding entities in particular cellular network technology (e.g., "PDSN" or "core network gateway node" in general for "SGSN", "MS" for "UE", etc.)

In the diagram 700, cache 1 contains the content such as the content 5 that is to be transmitted to a mobile device such as the mobile device 10, and the mobile device 10 has moved from the first location X (associated with RNC1 which, e.g., manages NodeB1) to the second location Y (associated with RNC2 which, e.g., manages NodeB2).

A virtual serving GPRS support node (vSGSN 1) is implemented by a computing device (e.g., cache server A) executing computer instructions on a processor of the RNC1. The vSGSN 1 is configured to send 3G control messages (referred to as RAB assignment message in FIG. 7) to instruct the RNC1 to set up a communication channel between RNC1 and RNC2. The RNC1 then sets up the data channel by sending a control-plane message to RNC2 (referred to as ALCAP: Iu transport bearer set up message in FIG. 7). The vSGSN 1 transmits the content 5 on behalf of cache 1 toward RNC2, and RNC1 forwards the content 5 to RNC2 as though the vSGSN 1 were a physical SGSN. In accordance with the instructions, the RNC1 forwards the content 5 from the cache 1 to the RNC2. The cache 1 and vSGSN 1 may be implemented in memory 30 of the computing device of the RNC1.

A computing device (executing computer instructions on a processor) included in or attached to the RNC2 implements virtual user equipment (vUE), cache 2, and virtual serving GPRS support node (vSGSN 2). The vUE acts like a mobile device (e.g., smart phone or cellular phone). The RNC2 transmits a control message (referred to as RB setup message) to set up a virtual channel to RNC2 to vUE, and the RNC2 receives a control message (referred to as RAB assignment request) from the vSGSN 2 to set up a virtual channel from vSGSN 2 and RNC2. Upon receiving the RAB assignment request message from vSGSN2, RNC2 then sets up a channel to mobile device 10 (UE) by sending RB setup message. The virtual channel set up between RNC2 and vUE is then used by RNC2 to forward the content 5 received from RNC1 to vUE, which then forwards the content 5 to cache 2. Similarly, the virtual channel set up between vSGSN 2 and RNC2 and the channel set up between RNC2 and UE are used by vSGSN and RNC2 such that vSGSN 2 sends the content 5 (on behalf of cache 2) to RNC2, which forwards the content 5 to mobile device 10 (UE) via NodeB2 (not shown in FIG. 7). The NodeB2 acts like a relay device for transmitting the content 5 and/or transmission context corresponding to content 5.

As understood by one skilled in the art of cellular communications (such as in 3G cellular networks), data (such as the content 5) can originate from and/or terminate to user equipment (UE), can originate from and/or terminate to SGSN, or any combination thereof. However, data which is not being utilized as control messages does not originate from and/or terminate to NodeB and RNC according to cellular communication protocols (e.g., 3G protocol). In an exemplary embodiment, originating data such as content 5 is like placing/initiating a call (including sending a file such as video file, music file, picture file, text file, etc.) from one mobile device to terminate at another mobile device. In FIG. 7, the vSGSN1 originates (initiates the call to send) the content 5 to terminate at the vUE which is stored in the cache 2. The vSGSN 2 (or vUE) originates the content 5 to terminate at the mobile device 10 via the NodeB2.

The virtual entities such as the vSGNS1, vUE, and vSGSN2 operate like physical hardware and software such that the RNC1, RNC2, and NodeB2 can transmit and receive command messages according to a regular 3G cellular network protocols; this allows for sending the content 5 and/or the transmission context to the mobile device 10.

Figure 8:
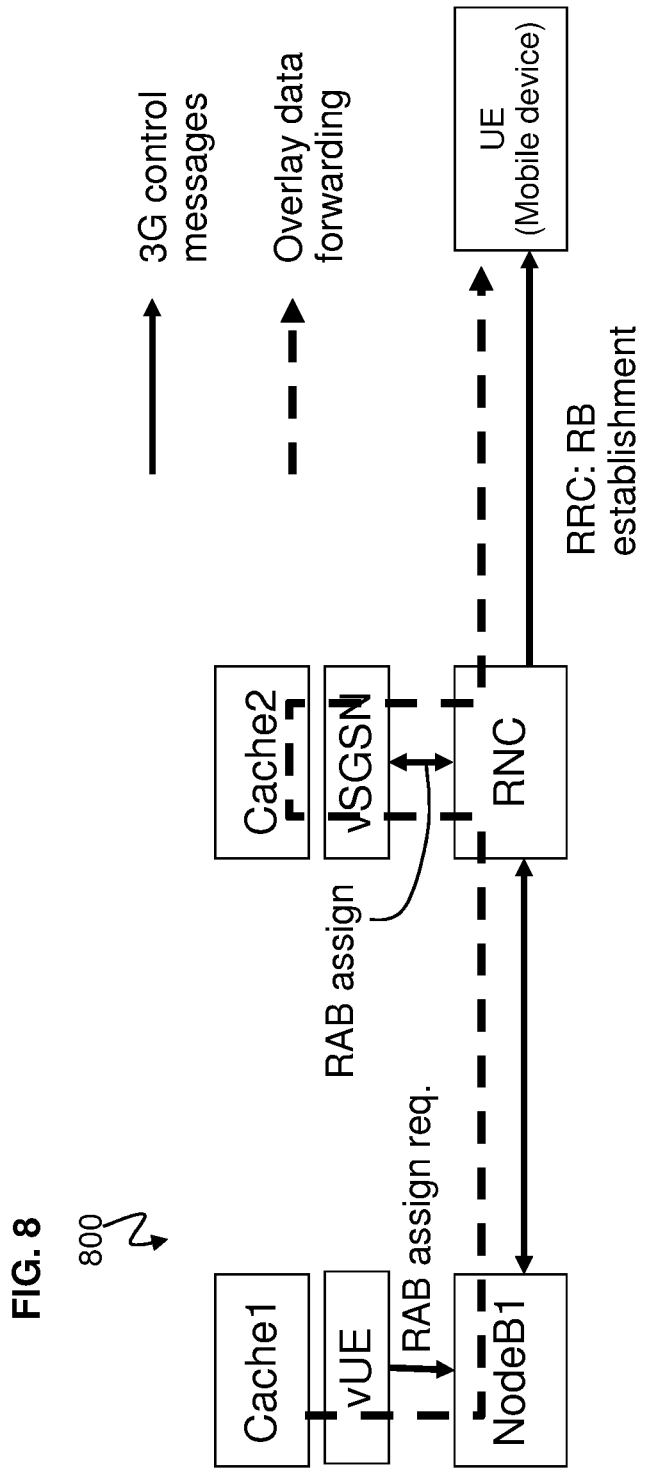
FIG. 8 depicts a diagram of an example overlay network according to an exemplary embodiment.

FIG. 8 depicts a diagram 800 of an example overlay network in a 3G cellular network using virtual network entities according to an exemplary embodiment. Diagram 800 is an overlay network that can apply for FIGS. 3 and 4. While every element in FIGS. 3 and 4 is not shown in the diagram 800 for the sake of conciseness, it is understood that the missing elements in FIGS. 3 and 4 are incorporated and functionally operate accordingly in FIG. 8.

In diagram 800, cache 1 contains the content such as the content 5 that is to be transmitted to a mobile device such as the mobile device 10, and the mobile device 10 has moved from the first location X (associated and serviced by NodeB1) to the second location Y (associated and serviced by NodeB2).

Virtual user equipment (vUE) (such as a virtual mobile device) and cache 1 are implemented by a computing device (executing computer instructions on a processor) of NodeB1. The vUE acts like the originator of the content 5 and transmits control messages (RAB assignment request) to the NodeB1 and instructs the NodeB1 to set up a data channel to RNC, so that NodeB1 can send the content 5 from cache 1 to the cache 2 of the RNC.

A virtual serving GPRS support node (vSGSN) and cache 2 are implemented by a computing device (executing computer instructions on a processor) of the RNC (such as RNC3 in FIGS. 3 and 4). The vSGSN is configured to receive a the request and send 3G control messages from/to RNC for setting up virtual channels to/from RNC. These virtual channels are utilized by vSGSN and RNC such that RNC can forward the content 5 received from NodeB1 to vSGSN and forward the content 5 received from vSGSN to UE, as though the vSGSN were a physical SGSN. According to the instructions, the RNC forwards the content 5 from the cache 2 to the mobile device 10 via NodeB2 (not shown in FIG. 8). The NodeB2 may act as a rely device to forward the content 5 to the mobile device 10 in location Y.

In FIG. 8, the vUE originates the content 5 to terminate at vSGSN (cache 2). As such, the vSGSN now originates the content 5 (stored in cache 2) to terminate at the mobile device 10. The virtual entities such as the vUE and vSGSN2 operate like physical hardware and software such that the NodeB1 and RNC can transmit and receive command messages according to a regular 3G cellular network for sending the content 5 and/or the transmission context to the mobile device 10. Also, the vSGSN may generally be referred to as a virtual core network gateway node. The examples in FIG. 7 and FIG. 8 are illustrated in the context of setting up overlay networks between two RNCs and between a NodeB and a RNC, but it is understood that these embodiments can apply to other scenarios of building overlays between any combinations of cellular network devices (e.g., between NodeB1-RNC-NodeB).

Certain examples are illustrated in the context of a 3G network for explanation purposes but not limitation. It is understood that exemplary embodiments can apply to 2G, 3G, 4G, other networks, and any combination thereof.

Figure 9:
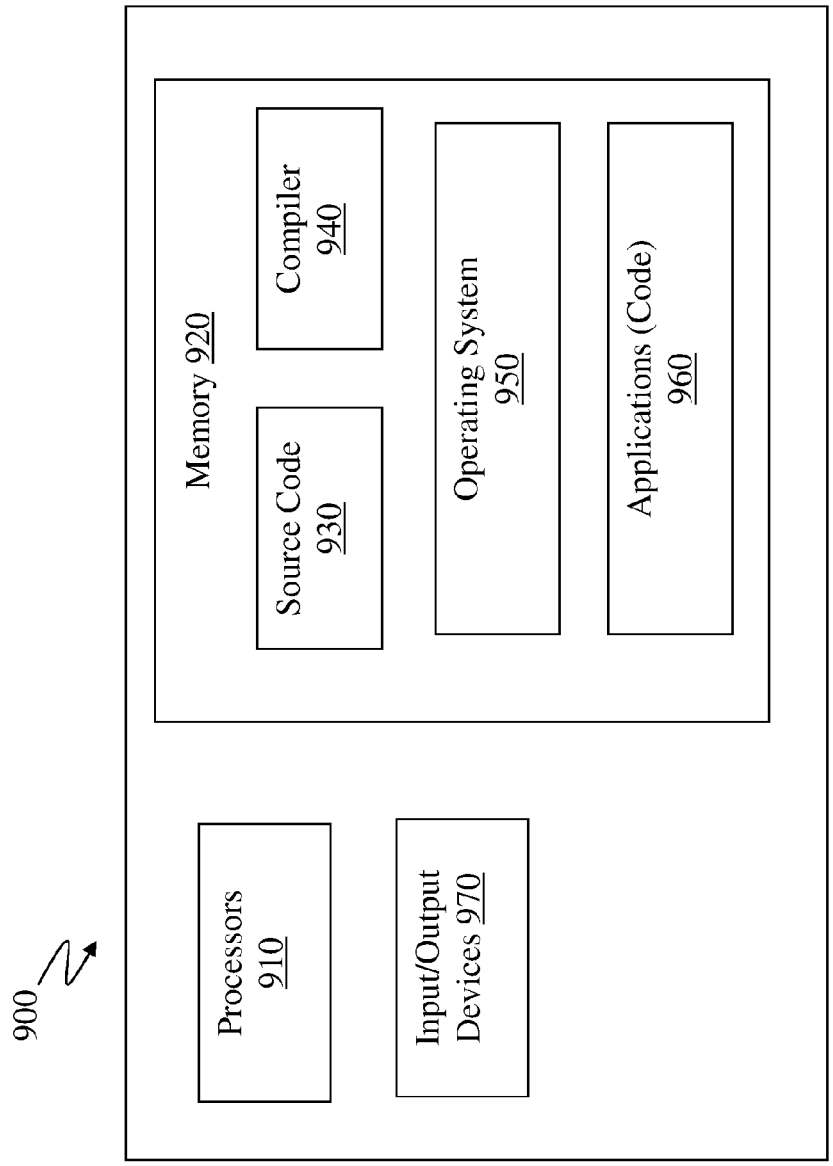
FIG. 9 depicts a computing system having features that may be utilized according to an exemplary embodiment.

FIG. 9 illustrates an example of a computer 900 having capabilities, which may be included in exemplary embodiments. Various methods, procedures, modules, flow diagrams, tools, application, and techniques discussed herein may also incorporate and/or utilize the capabilities of the computer 900. Moreover, capabilities of the computer 900 may be utilized to implement features of exemplary embodiments discussed herein including with reference to FIGS. 1-8. One or more of the capabilities of the computer 900 may implement any element discussed herein such as but not limited to the mobile device 10, RNCs, NodeBs, gateway 20, cache servers, caches, servers, computing devices, base stations, base station controllers, communication equipment, and other cellular network equipment.

Generally, in terms of hardware architecture, the computer 900 may include one or more processors 910, computer readable storage memory 920, and one or more input and/or output (I/O) devices 970 that are communicatively connected via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a data signal processor (DSP), or an auxiliary processor among several processors associated with the computer 900.

The computer readable memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 may incorporate electronic, magnetic, optical, and/or other types of storage media. Note that the memory 920 can have a distributed architecture, where various components are situated remote from one another, but can be accessed by the processor 910.

The software in the computer readable memory 920 may include one or more separate programs, each of which comprises an ordered listing of executable instructions for implementing logical functions. The software in the memory 920 includes a suitable operating system (O/S) 950, compiler 940, source code 930, and one or more applications 960 of the exemplary embodiments. As illustrated, the application 960 comprises numerous functional components for implementing the features, processes, methods, functions, and operations of the exemplary embodiments. Further, the application 960 may be a source program, executable program (object code), script, or any other entity comprising a set of instructions to be performed.

The I/O devices 970 may include input devices (or peripherals) such as, for example but not limited to, a mouse, keyboard, scanner, microphone, camera, etc. Furthermore, the I/O devices 970 may also include output devices (or peripherals), for example but not limited to, a printer, display, etc. Finally, the I/O devices 970 may further include devices that communicate both inputs and outputs, for instance but not limited to, a NIC or modulator/demodulator (for accessing remote devices, other files, devices, systems, or a network), a radio frequency (RF) or other transceiver (tower), a telephonic interface, a bridge, a router, etc. The I/O devices 970 also include components for communicating over various networks, such as the internet or an intranet. The I/O devices 970 may be connected to and/or communicate with the processor 910 utilizing Bluetooth connections and cables (via, e.g., Universal Serial Bus (USB) ports, serial ports, parallel ports, fiber optics, FireWire, HDMI (High-Definition Multimedia Interface), etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for transmitting an object to a mobile device, the method comprising:

in response to the mobile device moving from a first area serviced by a first cache that stores a same object to a second area serviced by a second cache, receiving by the second cache a transmission context of the same object from the first cache;

the second cache locally storing the same object as the first cache;

transmitting by the second cache the same object locally stored in the second cache to the mobile device in the second area according to the transmission context received from the first cache;

transmitting a discovery request message indicating that the second cache is searching to discover a previously servicing cache that previously serviced the mobile device prior to moving to the second area; and receiving a discovery response message at the second cache from the first cache in which the discovery response message indicates that the first cache was previously servicing the mobile device.

2. The method of claim 1, wherein the transmission context comprises a content identification of the same object and a transmission state of the same object.

3. The method of claim 2, wherein the transmission state comprises at least one of:

sequence numbers for packets of the same object already transmitted by the first cache to the mobile device when in the first area;

sequence numbers for a last group of packets of the same object already transmitted by the first cache to the mobile device when in the first area; and sequence numbers for packets of the same object acknowledged as being received by the mobile device while in the first area.

4. The method of claim 1, further comprising monitoring, by the second cache, packets received with unknown transmission context from the second area.

5. The method of claim 1, wherein the second cache is configured to receive the transmission context of the same object such that the second cache can continue transmitting packets of the same object to the mobile device from where the first cache stopped.

6. A system for transmitting an object to a mobile device, the system comprising:

a network;

a first cache configured to communicate with a second cache over the network, the second cache storing a same object as the first cache;

in response to the mobile device moving from a first area serviced by the first cache to a second area serviced by the second cache, the second cache is configured to receive a transmission context of the same object from the first cache;

the second cache is configured to transmit the same object stored in the second cache to the mobile device in the second area according to the transmission context received from the first cache;

wherein the second cache is configured to transmit a discovery request message which indicates that the second cache is searching to discover a previously servicing cache that previously serviced the mobile device prior to moving to the second area; and wherein the second cache is configured to receive a discovery response message from the first cache in which the discovery response message indicates that the first cache was previously servicing the mobile device.

7. The system of claim 6, wherein the transmission context comprises a content identification of the same object and a transmission state of the same object.

8. The system of claim 6, wherein the second cache is configured to monitoring packets received with unknown transmission context from the second area.

9. The system of claim 6, wherein the second cache is configured to receive the transmission context of the same object such that the second cache can continue transmitting packets of the same object to the mobile device from where the first cache stopped.

* * * * *